(12) United States Patent
Bonk et al.

(10) Patent No.: US 12,275,887 B2
(45) Date of Patent: Apr. 15, 2025

(54) METHOD FOR STORING AN INORGANIC SALT, AND STORAGE DEVICE

(71) Applicant: Deutsches Zentrum für Luft—und Raumfahrt e.V., Cologne (DE)

(72) Inventors: Alexander Bonk, Pforzheim (DE); Markus Braun, Karlsruhe (DE); Jochen Forstner, Simmozheim (DE); Veronika Sötz, Cologne (DE); Thomas Bauer, Cologne (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 806 days.

(21) Appl. No.: 17/350,981

(22) Filed: Jun. 17, 2021

(65) Prior Publication Data

US 2021/0309903 A1   Oct. 7, 2021

Related U.S. Application Data

(63) Continuation of application No. PCT/EP2019/084937, filed on Dec. 12, 2019.

(30) Foreign Application Priority Data

Dec. 20, 2018   (DE) ............... 10 2018 222 602.4

(51) Int. Cl.
C09K 5/12 (2006.01)

(52) U.S. Cl.
CPC ........................ C09K 5/12 (2013.01)

(58) Field of Classification Search
CPC . C09K 5/12; Y02E 60/14; F28D 20/02; F28D 2020/0047
See application file for complete search history.

(56) References Cited

U.S. PATENT DOCUMENTS

| | | |
|---|---|---|
| 2,375,758 A | 5/1945 | Bates et al. |
| 7,828,990 B1 | 11/2010 | Cordaro et al. |
| 2017/0037293 A1* | 2/2017 | Perez Trujillo .......... C09K 5/12 |

(Continued)

FOREIGN PATENT DOCUMENTS

| | | |
|---|---|---|
| DE | 20 2012 103 714 U1 | 8/2013 |
| DE | 10 2012 102 529 A1 | 9/2013 |

(Continued)

OTHER PUBLICATIONS

A. Bonk, S. Sau, N. Uranga, M. Herainz und T. Bauer, „Advanced heat transfer fluids for direct molten salt line-focusing CSP plants, Progress in Energy and Combustion Science Bd. 67C, pp. 69-87, Available online Mar. 2, 2018.

(Continued)

*Primary Examiner* — Andrew J. Oyer
(74) *Attorney, Agent, or Firm* — ASLAN LAW, P.C.

(57) ABSTRACT

A method for storing an inorganic salt, wherein the inorganic salt has a long service life, and the stability of a salt melt made of the inorganic salt is increased. This is achieved in that the inorganic salt is provided in a liquid state, wherein the inorganic salt comprises anions which decompose when heat is supplied, thereby forming at least one gaseous decomposition product, and the pressure of the gas atmosphere is set such that the gas atmosphere is in chemical equilibrium with the inorganic salt in the liquid state.

12 Claims, 6 Drawing Sheets

(56) References Cited

U.S. PATENT DOCUMENTS

| | | | |
|---|---|---|---|
| 2017/0158931 | A1 | 6/2017 | Heilmann et al. |
| 2017/0205151 | A1 | 6/2017 | Wortmann et al. |
| 2018/0347912 | A1 | 12/2018 | Maksoud et al. |
| 2019/0137188 | A1* | 5/2019 | Wortmann .............. F24S 80/20 |

FOREIGN PATENT DOCUMENTS

| | | |
|---|---|---|
| DE | 10 2015 224 297 A1 | 6/2017 |
| WO | WO 2014/026915 A1 | 2/2014 |
| WO | WO 2016/001184 A1 | 1/2016 |
| WO | WO 2016/008617 A1 | 1/2016 |
| WO | WO 2017/093030 A1 | 6/2017 |
| WO | WO 2017/186566 A1 | 11/2017 |

OTHER PUBLICATIONS

T. Bauer, W.-D. Steinmann, D. Laing und R. Tamme, „Thermal Energy Storage Materials and Systems, Annual Review of Heat Transfer, Bd. 15, pp. 131-177, 2012.

P. Gauché, J. Rudman, M. Mabaso, W. A. Landman, T. W. Backström und A. C. Brent, „System value and progress of CSP, Solar Energy, Bd. 152, pp. 106-139, Available online Apr. 13, 2017.

W.-D. Steinmann, „Advances in Thermal Energy Storage Systems—Methods and Applications, K. Lovegrove und W. Stein, Hrsg., Woodhead Publishing, 2015, pp. 511-531.

* cited by examiner

METHOD FOR STORING AN INORGANIC SALT, AND STORAGE DEVICE

RELATED APPLICATION

This application is a continuation of international application No. PCT/EP2019/084937 filed on Dec. 12, 2019, and claims the benefit of German application No. 10 2018 222 602.4 filed on Dec. 20, 2018, which are incorporated herein by reference in their entirety and for all purposes.

FIELD OF DISCLOSURE

The present invention relates to a method for storing an inorganic salt, the inorganic salt being more particularly a heat transfer medium and/or a heat storage medium.

The present invention further relates to a storage device.

SUMMARY OF THE INVENTION

The object on which the present invention is based is that of providing a method for storing an inorganic salt wherein the inorganic salt has an increased lifetime and wherein stability of a salt melt comprising the inorganic salt is increased.

This object is achieved in the invention by a method for storing an inorganic salt, the inorganic salt being more particularly a heat transfer medium and/or a heat storage medium, and the method comprising the following:
- providing an inorganic salt in liquid state, comprising anions which on supply of heat decompose to form at least one gaseous disintegration product; and
- setting a pressure of a gas atmosphere, the gas atmosphere being in a chemical equilibrium with the inorganic salt in liquid state.

The method is used preferably in parabolic trough power plants or Fresnel power plants, which employ heat transfer media and/or heat storage media in high-temperature areas.

Alternatively the method of the invention may also be used generally in power-to-heat-to-power stores, in systems which comprise combined heat and power, examples being thermal power plants, in temporary stores for high-temperature process heat, in heat transfer applications in the process industry, and in other sensible heat stores utilizing molten salts.

The pressure of the gas atmosphere is more particularly a partial pressure of a gas or the sum of multiple or all the partial pressures of gases present.

The inorganic salt in liquid state is preferably a salt melt, comprising more particularly one or more ionic liquids. The inorganic salt here is present partly or completely in a form dissociated into anions and cations.

"Setting the pressure" of the gas atmosphere preferably entails an active setting of pressure.

The pressure of the gas atmosphere is preferably subject to open—and/or closed-loop control.

As a result of the pressure of the gas atmosphere being set, an equilibrium in the reaction decomposing the anions into at least one gaseous disintegration product is shifted preferably to the reactant side (anions), so that fewer anions are decomposed and the lifetime of the inorganic salt rises.

Because fewer anions are decomposed, physical alterations to the inorganic salt are preferably minimized. Thus, in particular, properties such as viscosity, heat capacity, melting temperature, and corrosiveness, for example, are substantially unchanged even when the inorganic salt is stored for years and, indeed, for decades.

It is possible with preference to increase an operating temperature by virtue of reduced decomposition of the anions in the inorganic salt, in comparison to open systems wherein it is not possible to set a pressure of the gas atmosphere.

It may be beneficial if the anions are formed of or comprise one or more of the following anions: nitrates, nitrites, chlorides, carbonates, and sulfates.

The inorganic salt preferably comprises one or more nitrate salts and one or more nitrite salts or is formed of a mixture of one or more nitrate salts and one or more nitrite salts.

A molar ratio of nitrate to nitrite is situated preferably at around 85:15.

It may be advantageous if the inorganic salt is formed of or comprises a mixture of two nitrate salts and two nitrite salts.

For example, the inorganic salt comprises one or more potassium salts and one or more sodium salts or is formed of a mixture of one or more sodium salts and one or more potassium salts.

A molar ratio of sodium to potassium is situated preferably at around 65:45.

It may be beneficial if the inorganic salt is formed of or comprises sodium nitrate, potassium nitrate, sodium nitrite, and potassium nitrite.

Provision may be made for the anions to comprise hydroxides which are in interaction and/or in equilibrium with water vapor in the gas atmosphere.

Additionally or alternatively, provision may be made for the anions to comprise oxide ions which are in interaction and/or in equilibrium with gaseous nitrogen oxides.

With inorganic nitrate salts, for example, sustained heating, more particularly at around 400° C. to around 500° C. (or more), results in the following decomposition reactions:

$$NO_3^- \rightleftharpoons NO_2^- + \frac{1}{2}O_2 \quad (1)$$

$$2NO_2^- \rightleftharpoons O^{2-} + NO + NO_2 \quad (2)$$

Produced in this case more particularly as gaseous disintegration products are oxygen ($O_2$), nitrogen monoxide (NO), and nitrogen dioxide ($NO_2$). Also formed may be further nitrogen oxides, for example dinitrogen tetroxide, dinitrogen pentoxide, nitrosyl azide, N-diazonitramide, dinitrogen trioxide, and trinitramide.

An equilibrium constant $K_1$ for reaction (1) in this case is:

The equilibrium constant $K_1$ is dependent on a partial pressure of the oxygen.

An equilibrium constant $K_2$ for reaction (2) comes about according to the following equation:

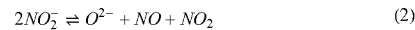

The equilibrium constant $K_2$ is dependent on a partial pressure of nitrogen monoxide and on a partial pressure of nitrogen dioxide.

An equilibrium constant of a decomposition reaction is preferably dependent on partial pressures of the different gaseous disintegration products.

The decomposition reactions are preferably reversible.

More particularly, the inorganic salt in liquid state comprises cations, the cations preferably being formed of or comprising metal cations.

The cations preferably comprise alkali metal cations, examples being one or more of the following cations, or are formed thereof: lithium cations, sodium cations, potassium cations, cesium cations, and rubidium cations.

Additionally or alternatively, the cations comprise alkaline earth metal cations, examples being one or more of the following cations, or are formed thereof: magnesium cations, calcium cations, strontium cations, and barium cations.

Provision may be made to use salt mixtures, for example a mixture of potassium nitrate and magnesium nitrate.

The following inorganic salts, for example, are stored with the method:
- alkali metal nitrates, alkaline earth metal nitrates, alkali metal nitrites, alkaline earth metal nitrites, or mixtures thereof; or
- alkali metal chlorides, alkaline earth metal chlorides, or mixtures thereof; or
- alkali metal carbonates, alkaline earth metal carbonates, or mixtures thereof; or
- alkali metal sulfates, alkaline earth metal sulfates, or mixtures thereof.

More particularly the cations comprise aluminum cations and/or lead cations or are formed thereof.

Additionally or alternatively, the cations comprise transition metal cations, examples being one or more of the following cations, or are formed thereof: nickel cations, molybdenum cations, cobalt cations, zirconium cations, titanium cations, manganese cations, iron cations, copper cations, chromium cations, and zinc cations.

In the case of nitrate—and/or nitrite-containing inorganic salts or nitrate salts and/or nitrite salts, the gas atmosphere preferably comprises one or more of the following gases: nitrogen, argon, oxygen, ozone, nitrogen monoxide, nitrogen dioxide, dinitrogen tetroxide, dinitrogen pentoxide, nitrosyl azide, N-diazonitramide, dinitrogen trioxide, and trinitramide. Alternatively the gas atmosphere is formed of nitrogen monoxide, oxygen, nitrogen dioxide, dinitrogen tetroxide, dinitrogen pentoxide, nitrosyl azide, N-diazonitramide, dinitrogen trioxide, and trinitramide.

There is preferably around 10% (vol % or mol %) to around 100% (vol % or mol %) of oxygen in the gas atmosphere.

The gas atmosphere preferably comprises oxygen, nitrogen monoxide, and a further nitrogen oxide, for example dinitrogen monoxide or nitrogen dioxide or dinitrogen tetroxide.

Having proven particularly suitable is an oxygen fraction of around 50 vol % or more, based on a total volume of the gas atmosphere.

More particularly there is an oxygen fraction of around 50 mol % or more, based on a total amount of substance in the gas atmosphere.

Preferably there is around 0.001% (vol % or mol %) to around 80% (vol % or mol %), more particularly around 1% (vol % or mol %) to around 50% (vol % or mol %), of nitrogen oxides in the gas atmosphere.

A fraction of nitrogen monoxide in the gas atmosphere is preferably in a range from around 0.1 vol % to around 1 vol %, based on a total volume of the gas atmosphere, and/or in a range from around 0.1 mol % to around 1 mol %, based on a total amount of substance in the gas atmosphere.

Additionally to the nitrogen monoxide, the gas atmosphere preferably comprises a further nitrogen oxide, for example dinitrogen monoxide or nitrogen dioxide or dinitrogen tetroxide, more particularly in a fraction of around 0.01 vol % to around 1 vol %, based on the total volume of the gas atmosphere, and/or in a fraction of around 0.01 mol % to around 1 mol %, based on the total amount of substance in the gas atmosphere.

In the case of chloride-containing inorganic salts or chloride salts, the gas atmosphere preferably comprises one or more of the following gases: nitrogen, argon, hydrogen, chlorine, and hydrogen chloride. Alternatively the gas atmosphere is formed of chlorine and/or hydrogen chloride.

In the case of chloride-containing inorganic salts or chloride salts as well it is possible for nitrogen oxides to be formed, examples being one or more of the following nitrogen oxides: nitrogen monoxide, nitrogen dioxide, dinitrogen tetroxide, dinitrogen pentoxide, nitrosyl azide, N-diazonitramide, dinitrogen trioxide, and trinitramide.

In the case of carbonate-containing inorganic salts or carbonate salts, the gas atmosphere preferably comprises one or more of the following gases: nitrogen, argon, oxygen, carbon monoxide, and carbon dioxide. Alternatively the gas atmosphere is formed of carbon monoxide and/or carbon dioxide.

In the case of carbonate-containing inorganic salts or carbonate salts as well it is possible for nitrogen oxides to be formed, examples being one or more of the following nitrogen oxides: nitrogen monoxide, nitrogen dioxide, dinitrogen tetroxide, dinitrogen pentoxide, nitrosyl azide, N-diazonitramide, dinitrogen trioxide, and trinitramide.

In the case of sulfate-containing inorganic salts or sulfate salts, the gas atmosphere preferably comprises one or more of the following gases: nitrogen, argon, sulfur monoxide, and sulfur dioxide. Alternatively the gas atmosphere is formed of sulfur monoxide and/or sulfur dioxide.

In the case of sulfate-containing inorganic salts or sulfate salts as well it is possible for nitrogen oxides to be formed, examples being one or more of the following nitrogen oxides: nitrogen monoxide, nitrogen dioxide, dinitrogen tetroxide, dinitrogen pentoxide, nitrosyl azide, N-diazonitramide, dinitrogen trioxide, and trinitramide.

Besides sulfur monoxide and/or sulfur dioxide, further sulfur gases may also form.

Nitrogen and/or argon serve more particularly as inert gas and more particularly are not in interaction with the inorganic salt in liquid state.

It may be beneficial if the inorganic salt in liquid state is provided in at least one receiving container of a fluidtight fluid conduit of a storage device, a constant pressure of the gas atmosphere in the at least one receiving container being set more particularly by means of an open- and/or closed-loop pressure control device.

As a result of the setting, more particularly the active setting, of the pressure of the gas atmosphere, the equilibrium of a reaction in which the anions are decomposed is shifted preferably, in a controlled way, to the reactant side.

For improved control of the method, provision may be made for measurements to be performed in the inorganic salt during storage, more particularly in order to monitor a decomposition reaction. With preference a qualitative characterization of anions is performed ex situ.

In order to minimize corrosion, it may be advantageous if an oxide ion fraction ($O^{2-}$ fraction) of the inorganic salt in liquid state is set. For this purpose, in particular, carbon dioxide is added to the gas atmosphere, and forms carbonates with the oxide ions of the inorganic salt in liquid state. Carbonates are typically less corrosive than oxide ions.

A fraction of the anions in the inorganic salt in liquid state is determined preferably by ion chromatography. Calibration for this purpose takes place preferably within the immediate measurement region. More particularly, a calibration plot is employed to identify a peak area of the measurement at the corresponding concentration. For the anions, preference is given to using a "least square polynomial fit" function for curve fitting, and a standard deviation.

Through analysis of further species, examples being halides, carbonates, chromates, and silicates, constituents present in the fluid conduit may be characterized, more particularly in terms of quality.

The inorganic salt in liquid state and the gas atmosphere preferably form an isochoric system in a hermetically sealed fluid conduit of a storage device. The above-described shift of equilibrium to reactant side may be realized by virtue of the substantially unchanged volume of the gas atmosphere.

The fluid conduit is preferably sealed off hermetically before heating and/or before commissioning of the storage device.

Provision may be made for the pressure of the gas atmosphere to be set by increasing a partial pressure of at least one gaseous disintegration product, the partial pressure being increased more particularly by supplying the at least one gaseous disintegration product to the gas atmosphere or by providing the inorganic salt in liquid state in at least one receiving container of a fluidtight fluid conduit.

With preference an auxiliary-gas supply device is provided by means of which one or more gaseous disintegration products are supplied and/or suppliable to the gas atmosphere.

Additionally or alternatively, the gas atmosphere is supplied by means of the auxiliary-gas supply device with an inert gas, nitrogen or argon for example, and/or the gas atmosphere can be supplied with an inert gas by means of the auxiliary-gas supply device.

Alternatively there is no need for the auxiliary-gas device and more particularly no need for the use of purge gases.

For example, the inorganic salt in liquid state is flushed with one or more gases.

The sum of the partial pressures of all the gaseous components of the gas atmosphere gives the overall pressure of the fluid conduit.

The fluid conduit is preferably a constituent of a storage device.

It may be beneficial if the fluid conduit is operated with an overpressure of the gas atmosphere.

The overpressure of the gas atmosphere is preferably around 0.1 bar or more, more particularly around 0.3 bar or more, for example around 0.4 bar or more.

The overpressure of the gas atmosphere is preferably around 1 bar or less, more particularly around 0.7 bar or less, for example around 0.6 bar or less.

A preferred pressure of the gas atmosphere is situated in a range between around 0.01 bar and around 0.5 bar.

According to one preferred embodiment, the overpressure of the gas atmosphere after establishment of an equilibrium state is around 0.5 bar or less.

The overpressure is established, for example, by the ending of the reaction in which the anions are decomposed.

Alternatively the overpressure may be generated by means of the open- and/or closed-loop pressure control device, a compressed gas being introduced more particularly into the at least one receiving container.

An overpressure of the gas atmosphere preferably prevents extraneous gases or extraneous fluids penetrating from the surroundings of the storage device.

Provision may further be made for the storage device to be operated with a predetermined leakage rate. This is accompanied more particularly by a tolerable decomposition rate. A leak is disposed, for example, in the region of a pump shaft of a pump by means of which the inorganic salt is conveyed.

A leakage rate is preferably around 10 vol % or less per day, more particularly around 5 vol % or less per day, for example around 1 vol % or less per day, based on a total volume of the at least one receiving container.

The at least one receiving container is produced preferably from a metallic material. The at least one receiving container is produced preferably from steel, more particularly from stainless steel.

For example, the at least one receiving container is produced from alloys of steel with the steel grades 1.44xx, 1.45xx, 1.48xx, 2.xxxx, or mixtures thereof.

Provision may be made for the at least one receiving container to be a storage tank, for example a storage tank which is at least approximately hollow-cylindrical in shape.

Alternatively the at least one receiving container may be formed of a section of piping.

The inorganic salt in liquid state is preferably provided in at least one receiving container of a fluidtight fluid conduit of a storage device, the fluid conduit comprising a heat transfer device for heating and/or cooling the inorganic salt. More particularly the heat transfer device comprises a first heat transfer element for heating the inorganic salt, and/or a second heat transfer element for cooling the inorganic salt.

It may be beneficial if the inorganic salt is taken off from the at least one receiving container, more particularly by means of a heating line of the heat transfer device, and is heated by means of the first heat transfer element before the inorganic salt in heated state is introduced into the at least one receiving container.

Additionally or alternatively, the inorganic salt in heated state is taken off from the at least one receiving container, more particularly by means of a cooling line of the heat transfer device, and cooled by means of the second heat transfer element before the inorganic salt in cooled state is introduced into the at least one receiving container.

Provision may be made for a pump (first pump and second pump, respectively) for conveying the inorganic salt to be provided in the heating line and/or in the cooling line.

The invention further relates to a storage device for storing an inorganic salt, more particularly for use in a method of the invention, the inorganic salt comprising anions which on supply of heat decompose to form at least one gaseous disintegration product, the storage device comprising a fluid conduit, the fluid conduit comprising at least one receiving container for receiving the inorganic salt and comprising at least one open- and/or closed-loop pressure control device by means of which a pressure of at least one gas atmosphere within the fluid conduit can be subject to open- and/or closed-loop control, and the fluid conduit being fluidtight in configuration.

The gas atmosphere is disposed more particularly within the receiving container. In embodiments in which the fluid conduit comprises two or more receiving containers, provision may be made for the gas atmosphere to extend over the two or more receiving containers. An alternative possibility is for different gas atmospheres to be disposed in different receiving containers. Embodiments which comprise two or more, more particularly two, receiving containers will be addressed in more detail below.

The at least one open- and/or closed-loop pressure control preferably comprises at least one sensor element for measuring the pressure in the at least one gas atmosphere in the at least one receiving container.

Additionally or alternatively, the at least one open- and/or closed-loop pressure control device comprises an equalizing device for equalizing the pressure in the at least one receiving container. The equalizing device preferably comprises an equalizing container for storing one or more pressurized fluids, a pressure generator for influencing a pressure in the equalizing container, more particularly a compressor, and/or at least one heat exchanger for influencing a temperature in the equalizing container.

A gas stream within the equalizing device is preferably unblockable, blockable or regulatable by means of one or more valves, more particularly shutoff valves.

Provision may be made for the equalizing container to comprise a pressurized gas region and a pressurized liquid region, a pressurized gas being storable in the pressurized gas region, a pressurized liquid being storable in the pressurized liquid region, and the pressurized gas being convertible into the pressurized liquid by condensation and/or the pressurized liquid being convertible into the pressurized gas by evaporation.

The pressurized gas and/or the pressurized liquid are preferably introducible into the at least one receiving container by means of different lines, regulatable by different valves.

For condensing the pressurized gas, a temperature in the equalizing container is preferably lowered to a temperature below a boiling temperature of the pressurized gas.

For evaporating the pressurized liquid, a temperature in the equalizing container is increased more particularly to a temperature above the boiling temperature of the pressurized gas.

The condensation and/or the evaporation can be carried out more particularly at a pressure level of the at least one receiving container+0.2 bar and/or are carried out at a pressure level of the at least one receiving container #0.2 bar.

Pressurized gas present in the pressurized gas region comprises, for example, nitrogen, nitrogen monoxide, nitrogen dioxide, and/or oxygen, whereas liquid $NO_2$ condenses (pressurized liquid) in the pressurized liquid region.

By this means it is possible to shift an equilibrium of a reaction of nitrogen monoxide and oxygen to form (gaseous) nitrogen dioxide toward the product side, since the reaction product is at least partly removed as a result of the condensation.

Provision may be made for the storage device to comprise a safety device for preventing the at least one receiving container bursting and/or imploding, the safety device comprising an overpressure valve and/or an underpressure valve, said valve or valves being connected, more particularly fluidically, to the at least one receiving container.

The overpressure valve is more particularly a safety overpressure valve.

The underpressure valve is more particularly a safety underpressure valve.

In embodiments which comprise two or more receiving containers, a number of overpressure valves and a number of underpressure valves preferably each correspond to a number of receiving containers.

The fluid conduit preferably comprises a heat transfer device, the heat transfer device comprising a first heat transfer element, more particularly a heating element, by means of which the inorganic salt can be heated, and the heat transfer device comprising a second heat transfer element, more particularly a heat sink, by means of which the inorganic salt can be cooled.

The fluid conduit preferably comprises a first receiving container for receiving the inorganic salt in heated state, and a second receiving container for receiving the inorganic salt in cooled state. The first receiving container and the second receiving container are preferably connected fluidically to one another.

It may be beneficial if the first receiving container and the second receiving container are thermally couplable and/or coupled to one another by means of a heat transfer device of the fluid conduit, comprising one or more heat transfer elements.

There is in particular no direct heat transfer between the first receiving container and the second receiving container.

Provision may be made for the fluid conduit to comprise a first fluid conduit section and a second fluid conduit section, in particular a first gas atmosphere of the first fluid conduit section and a second gas atmosphere of the second fluid conduit section being subjectable to open- and/or closed-loop control separately from one another in terms of pressure and/or composition.

A first receiving container and a first open- and/or closed-loop pressure control device are preferably arranged in the first fluid conduit section for controlling in open- and/or closed-loop manner a pressure of the first gas atmosphere in the first fluid conduit section.

In particular, a second receiving container and a second open- and/or closed-loop pressure control device are arranged in the second fluid conduit section for controlling in open- and/or closed-loop manner a pressure of the second gas atmosphere in the second fluid conduit section.

The first receiving container and the second receiving container are preferably thermally couplable and/or coupled to one another by means of a heat transfer device of the fluid conduit, comprising one or more heat transfer elements.

The storage device of the invention preferably has one or more of the features described in connection with the method of the invention, and/or one or more of the advantages described in connection with the method of the invention.

Regeneration of the inorganic salt by shifting of the decomposition reaction to the reactant side may take place both in the first receiving container and in the second receiving container.

The regeneration may be carried out more particularly both in a hot receiving container and in a cold receiving container.

For kinetic reasons, more particularly, regeneration at elevated temperatures may be preferred.

Provision may be made for gas from the gas atmosphere to be introduced into a liquid region of one or more of the receiving containers. In this case the gas preferably bubbles through the inorganic salt in liquid state. For bubbling through, the gas may be passed through a lancelike line.

The liquid region is preferably a spatial region in the respective receiving container in which the inorganic salt in liquid state is disposed.

In the case of an inorganic salt mixture of sodium nitrate and potassium nitrate (60 wt % $NaNO_3$ and 40 wt % $KNO_3$), stored in a storage device with fluidtight fluid conduit, for example, one or more of the following results can be measured using qualitative chemical analysis techniques, for example using ion chromatography:

after 500 h at 550° C., a nitrite fraction in the salt mixture in liquid state is around 2.5 mol % or less; and/or after 500 h at 550° C., a nitrate fraction in the salt mixture in liquid state is around 97.5 mol % or more; and/or a pressure in the fluid conduit climbs on formation of nitrite, but drops off after about 50 h at 550° C., this being attributable to a shift in the equilibrium of the decomposition reaction to the reactant side and/or to a systematic leakage rate; and/or after 200 h at 580° C., a nitrate fraction in the salt mixture in liquid state is around 95.0 mol % or more, in comparison to around 94.0 mol % of nitrate in an open reference system without fluidtight fluid conduit, under the same reaction conditions;

after 200 h at 580° C., a nitrite fraction in the salt mixture in liquid state is around 5.0 mol % or less, in comparison to around 6.0 mol % of nitrite in an open reference system without fluidtight fluid conduit, under the same reaction conditions; and/or at 600° C., a nitrate fraction in the salt mixture in liquid state is around 93.0 mol % or more; and/or a salt chemistry at 600° C. is comparable with a salt chemistry in an open reference system without fluidtight fluid conduit at 580° C.

In particular, long-term operation of the storage device in a temperature range from around 240° C. to around 650° C. is possible.

Through investigations on the stated illustrative salt mixture, it has emerged that a stability of nitrate salts is determined by an amount of gaseous disintegration product formed, in the form of nitrite and/or oxide ions.

Of particular significance in this context are, in particular, partial pressures of oxygen, nitrogen dioxide, and nitrogen monoxide in the gas atmosphere.

By means of the fluidtight fluid conduit it is possible to minimize formation of disintegration products (for example, nitrites, oxide ions, etc., in the case of nitrate salts).

Further preferred features and/or advantages of the invention are subjects of the description hereinafter and of the graphical representation of exemplary embodiments.

BRIEF DESCRIPTION OF THE DRAWINGS

Identical or functionally equivalent elements are given the same reference symbols in all of the figures.

DETAILED DESCRIPTION OF THE DRAWINGS

Figure 1:
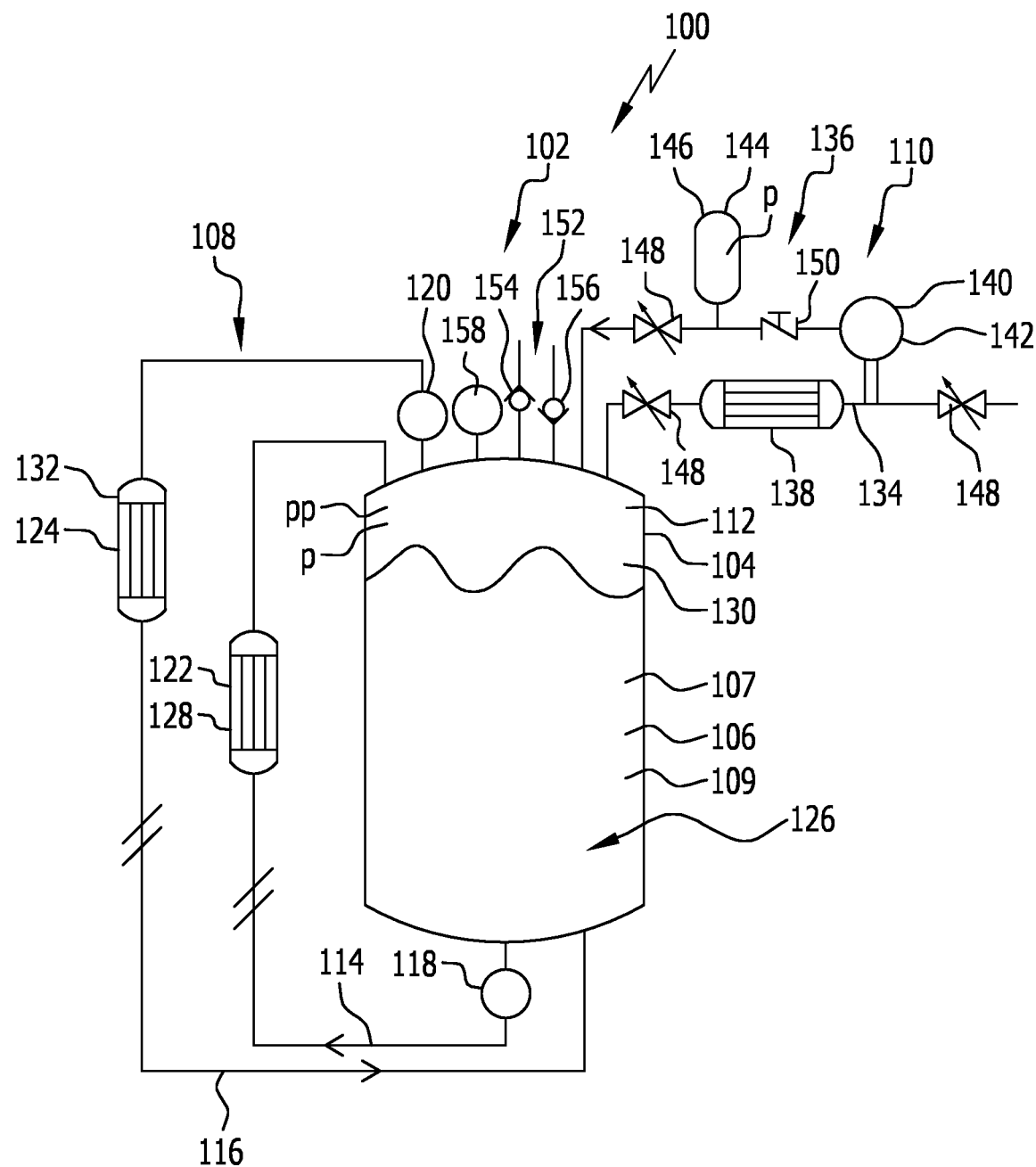
FIG. 1 shows a schematic representation of a first embodiment of a storage device for which a receiving container has been provided.

FIG. 1 illustrates a first embodiment of a storage device designated as a whole by 100.

The storage device 100 is suitable particularly for use in a parabolic trough power plant or a Fresnel power plant.

The storage device 100 preferably comprises a fluidtight fluid conduit 102 serving for storage and transportation of an inorganic salt 106 within the storage device 100.

The fluid conduit 102 presently comprises a receiving container 104 for receiving the inorganic salt 106, a heat transfer device 108 for setting and/or regulating a temperature of the inorganic salt 106, and an open- and/or closed-loop pressure control device 110 for controlling in open- and/or closed-loop manner a pressure of a gas atmosphere 112 in the receiving container 104 and/or in the fluid conduit 102.

The receiving container 104 is preferably at least approximately hollow-cylindrical in shape and/or is made of a metallic material, for example from steel according to one of the following alloys or mixtures thereof: 1.44xx, 1.45xx, 1.48xx and/or 2.xxxx. "x" here is in each case a placeholder for a more precise grade indicator.

The heat transfer device 108 preferably comprises a heating line 114, through which the inorganic salt 106 is conveyed and/or is conveyable for heating, and a cooling line 116, through which the inorganic salt 106 is conveyed and/or is conveyable for cooling.

The heating line 114 is preferably fluidically connected to the receiving container 104, and a flow of the inorganic salt 106 in liquid state through the heating line 114 can be shut off.

The heat transfer device 108 further comprises, in particular, a first pump 118 for conveying the inorganic salt 106 through the heating line 114, and a second pump 120 for conveying the inorganic salt 106 in liquid state through the cooling line 116.

The heat transfer device 108 presently further comprises a first heat transfer element 122 and a second heat transfer element 124.

The first pump 118 and the first heat transfer element 122 are preferably arranged along the heating line 114 and/or arranged between line sections of the heating line 114.

The second pump 120 and the second heat transfer element 124 are more particularly arranged along the cooling line 116 and/or arranged between line sections of the cooling line 116.

For heating the inorganic salt 106, the inorganic salt 106 in liquid state is taken off from the receiving container 104, preferably by means of the first pump 118, in a liquid region 126 of the receiving container 104, and is conveyed through the heating line 114 by means of the first pump 118.

The liquid region 126 is preferably a spatial region of the receiving container 104 in which the inorganic salt 106 in liquid state is disposed in a filled state of the receiving container 104.

By means of the first heat transfer element 122, more particularly a heating element 128, the inorganic salt 106 is preferably warmed and/or heated before being returned to the receiving container 104, in a gas region 130 of the receiving container 104, in heated state.

The gas region 130 is preferably a spatial region of the receiving container 104 in which the gas atmosphere 112 is disposed in a filled state of the receiving container 104.

For the cooling of the inorganic salt 106 in liquid state, the inorganic salt 106 is drawn off from the receiving container 104, preferably in the gas region 130 of the receiving container 104, and is conveyed through the cooling line 116 by means of the second pump 120, where the inorganic salt 106 is conveyed through the second heat transfer element 124, more particularly a heat sink 132, and is cooled accordingly.

Heat of the inorganic salt 106 in liquid state is transferred in particular to a material of the heat sink 132 and/or is transferrable to a material of the heat sink 132. The inorganic salt 106 in cooled state is subsequently introduced into the receiving container 104, preferably in the liquid region 126 of the receiving container 104.

The inorganic salt 106 is preferably a heat transfer medium 107, which serves as a carrier and/or transferrer of heat to another substance. More particularly the inorganic salt is a heat storage medium 109, by which heat can be stored and can be provided at a later time in a process.

Dwell containers, which may increase apparatus complexity and/or raise costs, are preferably dispensable.

The inorganic salt 106 in liquid state preferably comprises anions selected from the following anions: nitrates, nitrites, chlorides, carbonates, and sulfates. Alternatively the anions of the inorganic salt 106 in liquid state are formed of the stated anions—that is, nitrates, nitrites, chlorides, carbonates, or sulfates.

For example, the inorganic salt 106 in liquid state comprises a combination of one or more nitrates and one or more nitrites, or is formed from a mixture of one or more nitrate salts and one or more nitrite salts.

For example, the inorganic salt 106 is formed of a combination of one or more, two for example, nitrates and of one or more, two for example, nitrites.

Nitrates found particularly suitable include potassium nitrate and sodium nitrate.

Particularly suitable nitrites are potassium nitrite and sodium nitrite.

With preference a molar ratio of nitrate to nitrite of around 85:15 is selected and/or set.

More particularly a molar ratio of sodium to potassium of around 65:45 is selected and/or set.

The inorganic salt 106 preferably comprises sodium nitrate, potassium nitrate, sodium nitrite, and potassium nitrite, or is formed thereof.

The stated anions-nitrates, nitrites, chlorides, carbonates, and sulfates-preferably decompose on supply of heat to form at least one gaseous disintegration product.

Gaseous disintegration products in the case of nitrates are nitrogen monoxide, nitrogen dioxide and/or oxygen.

As well as nitrogen monoxide and nitrogen dioxide, further nitrogen oxides may also be formed, examples being dinitrogen tetroxide, dinitrogen pentoxide, nitrosylazide, N-diazonitramide, dinitrogen trioxide, and trinitramide.

In the case of chlorides as anions in the inorganic salt 106, supply of heat leads to formation of chlorine and/or hydrogen chloride.

In the case of carbonates as anions of the inorganic salt 106, gaseous disintegration products formed include carbon monoxide, carbon dioxide and/or oxygen.

In the case of sulfates as anions of the inorganic salt 106, gaseous disintegration products formed include sulfur oxides and/or oxygen. Further sulfur-containing gases may also be formed.

As a result of the fluidtight nature of the fluid conduit 102, the equilibrium in the disintegration reaction of the anion to form the gaseous disintegration product is preferably shifted to the reactant side.

For this purpose the pressure p of the gas atmosphere 112 can be set in particular by means of the open- and/or closed-loop pressure control device 110.

Accordingly, the stability of the inorganic salt 106 is preferably increased by comparison with open systems without hermetic sealing.

In spite of the hermetic sealing, provision may be made for the storage device 100 to be operated with a low leakage rate, in which case there is a leak in particular in the region of the first pump 118 and/or the second pump 120, at a respective pump shaft, for example.

Cations of the inorganic salt 106 in liquid state preferably comprise metal cations, more particularly aluminum cations and/or lead cations. In that case the inorganic salt 106 is an aluminum salt and/or a lead salt.

Additionally or alternatively to aluminum salts and/or lead salts, use may be made as inorganic salts 106 of transition metal salts, alkali metal salts or alkaline earth metal salts, or mixtures thereof.

In the case of transition metal salts, preference is given to nickel salts, molybdenum salts, cobalt salts, zirconium salts, titanium salts, manganese salts, iron salts, copper salts, chromium salts and/or zinc salts, with the corresponding cations being present in the liquid state of the inorganic salt 106.

In the case of alkali metal salts, preference is given to lithium salts, sodium salts, potassium salts, cesium salts and/or rubidium salts, with the corresponding cations being present in the liquid state of the inorganic salt 106.

In the case of alkaline earth metal salts, particular preference is given to magnesium salts, calcium salts, strontium salts and/or barium salts, with the corresponding cations being present in the liquid state of the inorganic salt 106.

The cations of the inorganic salt 106 in particular do not participate in the decomposition reaction of the anions.

The decomposition reaction of the anions is preferably reversible.

Provision may be made for the fluid conduit 102 to be hermetically sealed and in particular for no further gas to be added. The hermetic sealing takes place preferably before the inorganic salt 106 is heated and/or before a storage device 100 is commissioned.

After the start of the decomposition reaction of the anions, there is a rise in particular in a partial pressure pp of the gaseous disintegration product, as a result of which the equilibrium after a certain time shifts to the reactant side (anions).

As a result of the hermetic sealing, there is in particular an accumulation of the gaseous disintegration product.

More particularly, no gaseous disintegration products are provided to the surroundings of the fluid conduit 102. Emission of oxides of nitrogen, for example, is minimized.

A long-term temperature range in which the receiving container 102 can be operated is preferably in a range from around 240° C. to around 650° C.

In this case, in the case of nitrates and/or nitrites as anions, the gas atmosphere 112 is formed of or comprises nitrogen monoxide, nitrogen dioxide, and oxygen.

In the case of chlorides as anions, the gas atmosphere 112, without additional dispensing of a gas, comprises chlorine and/or hydrogen chloride, in particular.

In the case of carbonates as anions, the gas atmosphere 112, without additional dispensing of a gas, preferably comprises oxygen, carbon monoxide and/or carbon dioxide, or is formed thereof.

In the case of sulfates as anions, the gas atmosphere 112, without additional dispensing of a gas, preferably comprises sulfur monoxide, sulfur dioxide and/or oxygen, or is formed thereof.

The gas atmosphere 112 is preferably actively set in such a way that it comprises oxygen, nitrogen monoxide and a further nitrogen oxide, for example dinitrogen monoxide or nitrogen dioxide or dinitrogen tetroxide, or is formed of the stated gases.

A fraction of the oxygen in the gas atmosphere 112 is preferably at around 50 vol % or more, based on a total volume of the gas atmosphere 112, and/or at around 50 mol % or more, based on a total amount of substance in the gas atmosphere 112.

A fraction of the nitrogen monoxide in the gas atmosphere 112 is preferably in a range from around 0.1 vol % to around 1 vol %, based on the total volume of the gas atmosphere 112, and/or from around 0.1 mol % to around 1 mol %, based on the total amount of substance in the gas atmosphere 112.

A fraction of the further nitrogen oxide, for example dinitrogen monoxide or nitrogen dioxide or dinitrogen tetroxide, in the gas atmosphere 112 is preferably in a range from around 0.01 vol % to around 1 vol %, based on the total volume of the gas atmosphere 112, and/or from around 0.1 mol % to around 1 mol %, based on the total amount of substance in the gas atmosphere 112.

Provision may alternatively be made for a gas, more particularly an unreactive gas, to be introduced and/or introducible into the receiving container 104 by means of the open- and/or closed-loop pressure control device 110.

Such gases are, for example, nitrogen and/or argon.

The open- and/or closed-loop pressure control device 110 preferably comprises one or more lines 134 by means of which there are connected elements of an equalizing device 136 of the open- and/or closed-loop pressure control device 110.

The elements of the equalizing device 136 are preferably at least a heat exchanger 138, a pressure generator 140, more particularly a compressor 142, and an equalizing container 144, preferably a gas container 146.

The heat exchanger 138 serves preferably for setting a temperature within the equalizing device 136, more particularly in the equalizing container 144.

By means of the compressor 142 it is possible in particular to compress gas carried in the equalizing device 136.

The equalizing container 144 serves in particular to store gas taken off from the receiving container 104.

Disposed in series in the flow direction are, preferably the heat exchanger 138, the compressor 142, and the equalizing container 144. A gas flow can be regulated in particular by means of valves 148 of the equalizing device 136 which are disposed between the individual elements of the equalizing device 136.

By means of the heat exchanger 138, preferably, a temperature of the gas stream is lowered when the pressure p is too high, and/or the temperature is raised when the pressure p is too low. In this way it is possible with preference to equalize pressure fluctuations.

In the event of a drop in pressure p of the gas atmosphere 112 in the receiving container 104, gas from the equalizing container 144 is introduced preferably into the receiving container 104. A gas pressure in this case can be regulated in particular by means of a valve 148 which is disposed in the flow direction between the equalizing container 144 and the receiving container 104.

Arranged preferably between the following elements is a valve 148 for regulating a gas pressure and/or for locking or unlocking the gas flow:
between the receiving container 104 and the heat exchanger 138; and/or
between the heat exchanger 138 and the compressor 142; and/or
between the equalizing container 144 and the receiving container 104.

The valves 148 are preferably shutoff valves.

Arranged between the equalizing container 104 and the compressor 142 is, in particular, a shutoff valve 150 (known as a "tight shutoff" valve), which blocks a return flow against the flow direction, particularly a return flow of impure gases, from the equalizing container 144 to the compressor 142. Alternatively to the shutoff valve 150 it is also possible to use a unidirectional flap valve.

In the event of a rise in pressure p of the gas atmosphere 112 in the receiving container 104 above a critical value, a valve 148 between the receiving container 104 is preferably opened (unblocked), causing gas to be exported from the receiving container 104 through lines 134.

The gas is conducted preferably through lines 134 into the compressor 142, where in particular it is compressed before it is introduced through lines 134 into the equalizing container 136. In the equalizing container, the gas, in particular, is stored until the pressure p in the receiving container 104 falls, so that—as already described-gas is introduced from the equalizing container 144.

The storage device 100 preferably further comprises a safety device 152. The safety device 152 more particularly comprises an overpressure valve 154, for example a safety overpressure valve, and an underpressure valve 156, for example a safety underpressure valve.

The overpressure valve 154 serves in particular to prevent a receiving container 104 bursting because of positive pressure. The overpressure valve 154 is preferably fluidically connected to the receiving container 104, more particularly to the gas region 130 of the receiving container 104.

The underpressure valve 156 serves preferably for preventing the receiving container 104 imploding as a result of negative pressure. The underpressure valve 156 is preferably fluidically connected to the receiving container 104, more particularly to the gas region 130 of the receiving container 104.

The open- and/or closed-loop pressure control device 110 preferably further comprises a sensor element 158, which is disposed in the gas region 130 of the receiving container 104 and/or is connected fluidically to the gas region 130 of the receiving container 104.

The sensor element 158 serves preferably for measurement of the pressure p in the gas atmosphere 112. More particularly, based on the pressure p measured by means of the sensor element 158, gas is introduced and/or drawn off by means of the open- and/or closed-loop pressure control device 110. This can be regulated preferably by means of valves 148.

Provision may be made for one or more of the gases elucidated in connection with the gas atmosphere 112 to be stored and/or storable in the equalizing container 144.

A partial pressure pp of a gas in the gas atmosphere 112 is preferably increased by means of the open- and/or closed-loop pressure control device 110 until the decomposition reaction is shifted to the reactant side.

Figure 2:
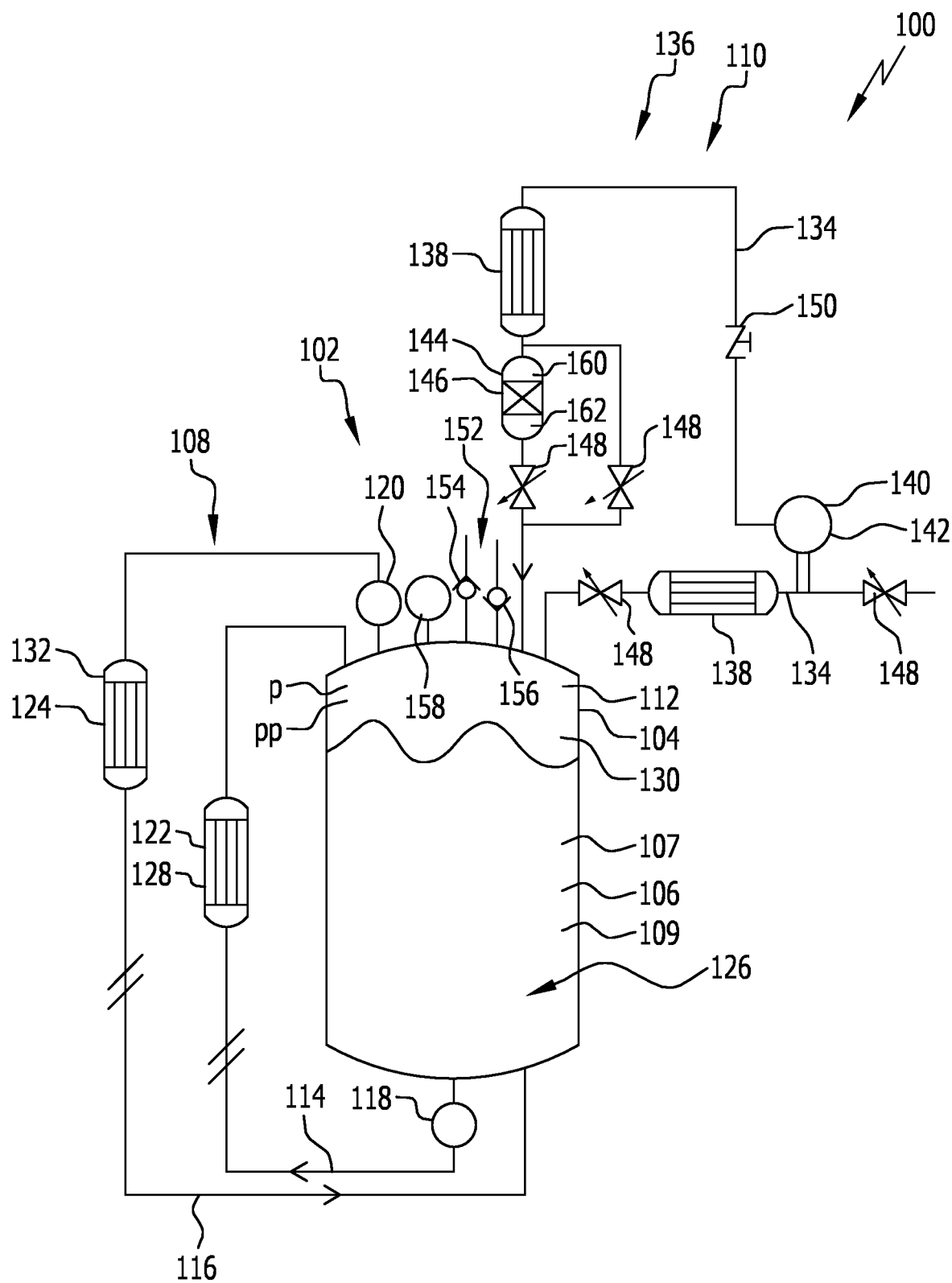
FIG. 2 shows a schematic representation of a second embodiment of a storage device for which a receiving container has been provided.

A second embodiment of a storage device 100, illustrated in FIG. 2, differs substantially in construction and function from the first embodiment, illustrated in FIG. 1, in that the equalizing device 136 comprises two heat exchangers 138 and in that the equalizing container 136 has a pressurized gas region 160 and a pressurized liquid region 162.

In the pressurized gas region 160 it is possible preferably to store a pressurized gas. In the pressurized liquid region 162 it is possible preferably to store a pressurized liquid.

In embodiments in which the anions are nitrates and/or nitrites, it has proven advantageous if liquid $NO_2$ forms the pressurized liquid.

By means of a heat exchanger 138 disposed immediately (separated only by one line section of a line 134 from the equalizing container 144) ahead of the equalizing container 144 in the flow direction, a gas which is located in lines 134 of the open- and/or closed-loop pressure control device 110 is preferably cooled to a temperature below the boiling temperature of the gas. The gas (pressurized gas) is condensed to form the pressurized liquid. The gas may also be a gas mixture.

Condensation of the pressurized gas is promoted preferably at elevated pressure p.

In the case of $NO_2$, in the course of condensation, an equilibrium of a reaction of nitrogen monoxide and oxygen to form nitrogen dioxide is shifted preferably toward the product side, since the gaseous product is removed as a result of the condensation of $NO_2$.

Located in the pressurized gas region 160 is, in particular, the pressurized gas, for example nitrogen monoxide, nitrogen, oxygen and nitrogen dioxide.

The condensed pressurized liquid, in particular, is located in and/or can be stored in the pressurized liquid region 162 of the equalizing container 144, more particularly in a sump of the equalizing container 144.

In the case of an equalizing container 144 comprising a pressurized gas region 160 and a pressurized liquid region 162 there are preferably two valves 148, more particularly shutoff valves, downstream as viewed in the flow direction. The valves 148 are more particularly connected in parallel.

By means of one of the two valves 148, a gas stream of a pressurized gas from the equalizing container 144 into the receiving container 104 can preferably be regulated.

By means of the other of the two valves 148, a liquid flow of a pressurized liquid from the equalizing container 144 into the receiving container 104 can preferably be regulated. The pressurized liquid evaporates preferably no later than on entry into the receiving container 104.

Otherwise, the second embodiment of a storage device 100, illustrated in FIG. 2, corresponds in construction and function to the embodiment illustrated in FIG. 1; consequently, reference is made, to that extent, to the description of said embodiment.

Figure 3:
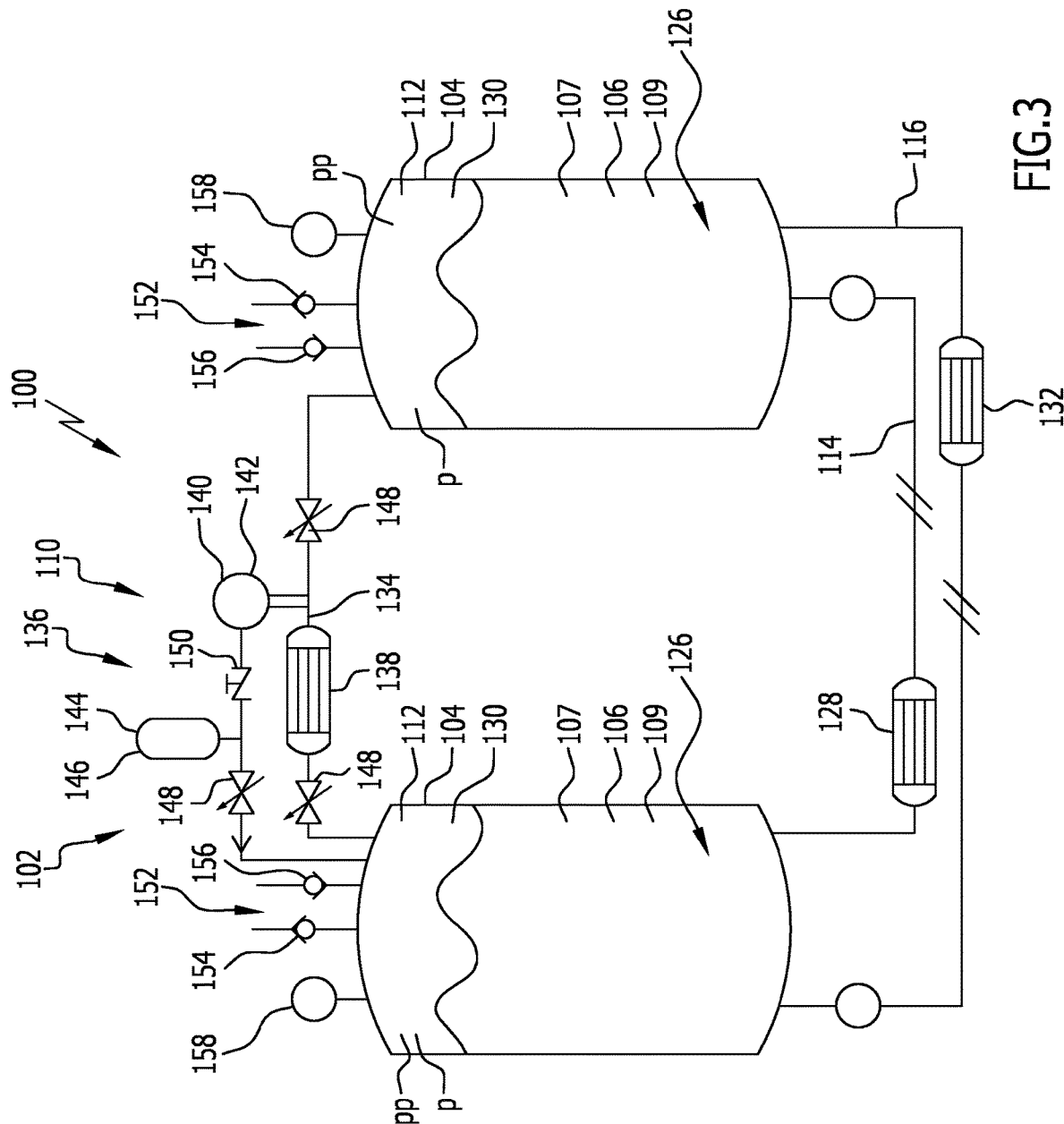
FIG. 3 shows a schematic representation of a third embodiment of a storage device for which two receiving containers have been provided.

A third embodiment of a storage device 100, illustrated in FIG. 3, differs in construction and function from the first embodiment illustrated in FIG. 1 substantially in that the fluid conduit 102 comprises a first receiving container 104 and a second receiving container 104.

The first receiving container 104 and the second receiving container 104 are here fluidically connected to one another by means of the heat transfer device 108 and the open- and/or closed-loop pressure control device 110 and/or thermally coupled indirectly (via the heat transfer device 108).

The first receiving container 104 functions preferably as a hot receiving container for receiving the inorganic salt 106 in heated state.

The second receiving container 104 functions in particular as a cold receiving container for receiving the inorganic salt 106 in cooled state.

Regeneration of the inorganic salt 106 through a shift in the decomposition reaction to the reactant side may take place both in the first receiving container 104 and in the second receiving container 104.

Regeneration at elevated temperatures is advantageous in view of the kinetics of the reactions.

Serving preferably for converting the inorganic salt 106 of the heated state into the cooled state and vice versa is the heat transfer device 108 (as elucidated in connection with FIG. 1).

A temperature of the inorganic salt 106 can be increased in steps.

The heating line 114 and the cooling line 116, which in particular are both disposed in the liquid region 126 of the respective receiving container 104, preferably connect the first receiving container 104 and the second receiving container 104.

The heating line 114 and the cooling line 116 preferably form a two-way line.

Furthermore, by means of lines 134 of the open- and/or closed-loop pressure control device 110, in particular, a fluidic connection is established between the first receiving container 104 and the second receiving container 104, with a flow of gas being regulatable by means of valves 148.

Provision may be made for a first sensor element 158 to be disposed on the first receiving container 104, and for a second sensor element 158 to be disposed on the second receiving container 104. The first and second sensor elements 158 serve preferably for measuring a pressure p of the gas atmosphere 112 in the respective receiving container 104.

The safety device 152 preferably comprises two overpressure valves 154, safety overpressure valves for example, and two underpressure valves 156, safety underpressure valves for example. More particularly, to avoid the first receiving container 104 bursting, an overpressure valve 154 is disposed on the first receiving container 104, and, to avoid the second receiving container 104 bursting, an overpressure valve 154 is disposed on the second receiving container 104.

Preferably, to avoid the first receiving container 104 imploding, an underpressure valve 156 is disposed on the first receiving container 104, and, to avoid the second receiving container 104 imploding, an underpressure valve 156 is disposed on the second receiving container 104.

Otherwise, the third embodiment of a storage device 100, illustrated in FIG. 3, corresponds in construction and function to the first embodiment, illustrated in FIG. 1; correspondingly, reference to that extent is made to the description of said embodiment.

Figure 4:
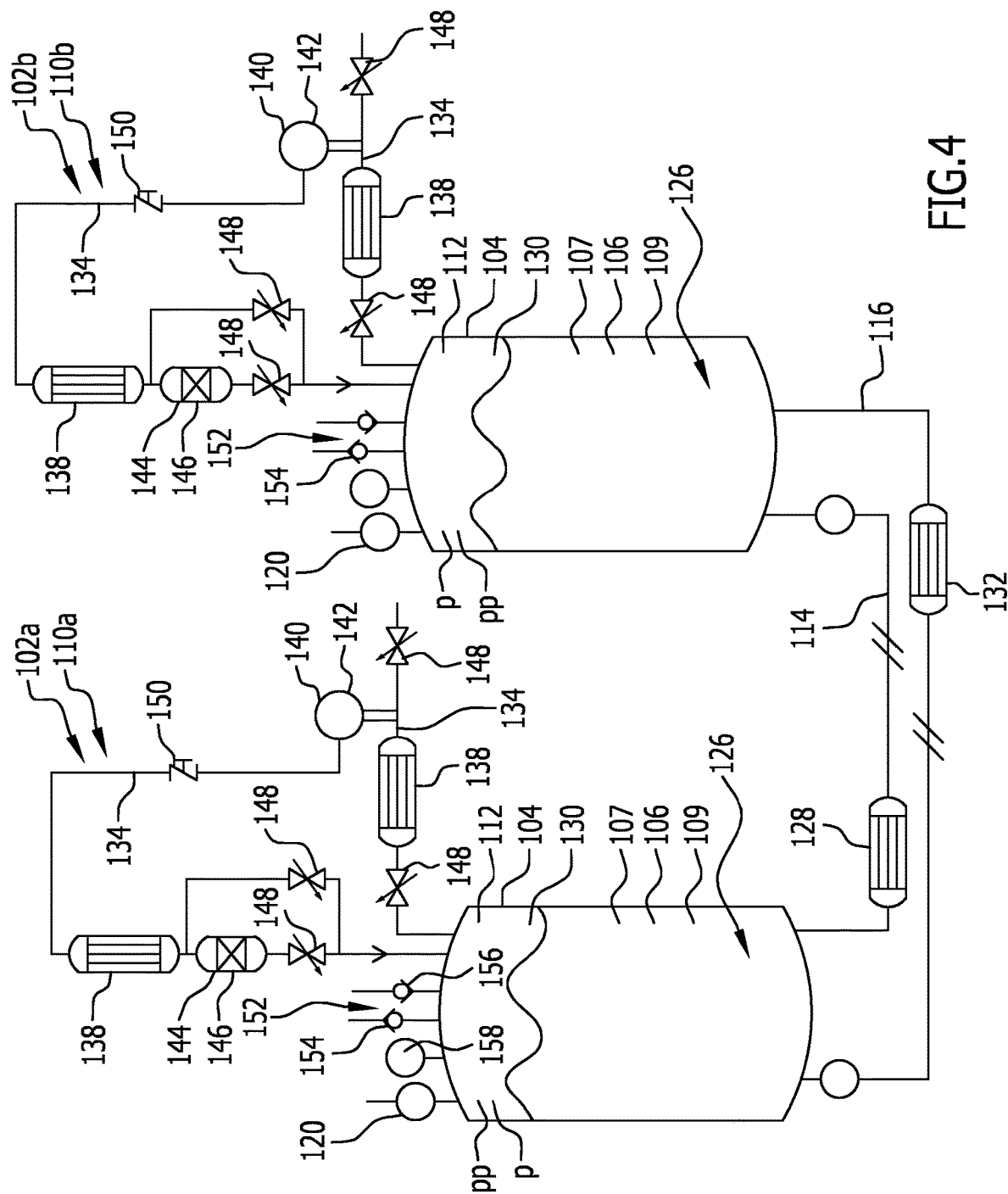
FIG. 4 shows a schematic representation of a fourth embodiment of a storage device for which two receiving containers have been provided.

A fourth embodiment of a storage device 100, illustrated in FIG. 4, differs in construction and function substantially from the embodiment illustrated in FIG. 3 in that the fluid conduit 102 comprises a first fluid conduit section 102a and a second fluid conduit section 102b.

Disposed preferably in the first fluid conduit section 102a is a first open- and/or closed-loop pressure control device 110a for controlling in open- and/or closed-loop manner a first gas atmosphere 112 in the first receiving container 104.

Disposed preferably in the second fluid conduit section 102b is a second open- and/or closed-loop pressure control device 110b for controlling in open- and/or closed-loop manner a second gas atmosphere 112 in the second receiving container 104.

By means of the heat transfer device 108, the first receiving container 104 and the second receiving container 104 are, in particular, thermally coupled indirectly.

There is preferably no pressure equalization between the first gas atmosphere 112 in the first receiving container 104 and the second gas atmosphere 112 in the second receiving container 104.

The first open- and/or closed-loop pressure control device 110a and the second open- and/or closed-loop pressure control device 110b are preferably each configured like open- and/or closed-loop pressure control device 110 according to the first embodiment in FIG. 1.

Otherwise, the fourth embodiment, illustrated in FIG. 4, corresponds in construction and function to the third embodiment, illustrated in FIG. 3; consequently, reference is to that extent made to the description of said embodiment.

Figure 5:
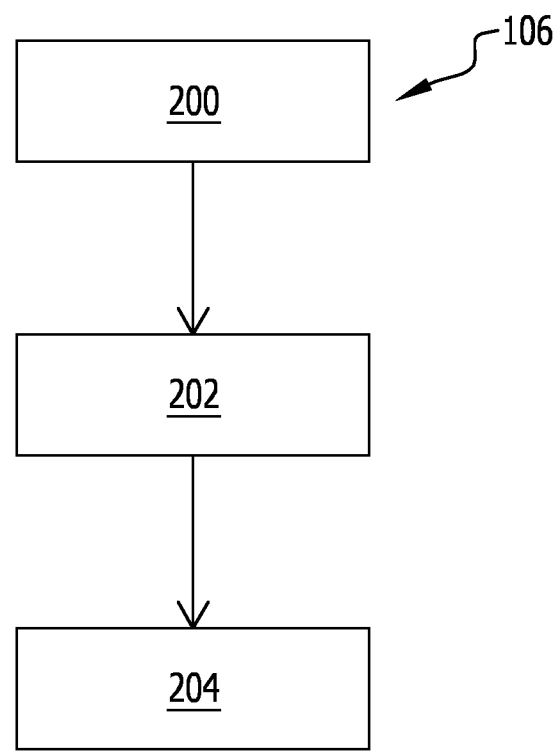
FIG. 5 shows a schematic representation of a flow diagram of a method for storing an inorganic salt.

FIG. 5 shows a schematic flow diagram of a method for storing the inorganic salt 106. The storage devices 100 illustrated in FIGS. 1 to 4 are suitable in particular for storing the inorganic salt 106 in accordance with the method described below.

According to a first method step 200, preferably, inorganic salt 106 is charged to one or more receiving containers 104, and a fluid conduit 102, comprising the one or more receiving containers 104, is preferably hermetically sealed.

In a second method step 202, the inorganic salt 106 is heated, more particularly by means of a heat transfer device 108, and is then (at the latest) in a liquid state. The inorganic salt 106 is preferably already in the liquid state on charging to the one or more receiving containers 104.

In the liquid state there is in particular an equilibrium between anions of the inorganic salt 106 and their gaseous disintegration products, which are present in a gas atmosphere 112 in the fluid conduit 102, more particularly in the region of the one or more receiving containers 104.

The gas atmosphere 112 is preferably in chemical equilibrium and/or in direct contact with the inorganic salt 106 in liquid state.

In a third method step 204, in particular, a pressure p of the gas atmosphere 112 is set by means of an open- and/or closed-loop pressure control device 110.

For this purpose, in particular, a sensor element 158 measures the pressure p in the gas atmosphere 112, which is equalized in particular by means of an equalizing device 136 of the open- and/or closed-loop pressure control device 110. For the open and/or closed-loop control, preferably, valves 148 of the equalizing device 136 are unblocked, blocked, or brought into a partially opened position.

In the event of an overpressure, a gas stream is removed from the one or more receiving containers 104, through lines 134 of the open- and/or closed-loop pressure control device 110, and stored in an equalizing container 144 of the equalizing device 136.

The gas is compressed preferably by means of a pressure generator 140, more preferably a compressor 142, before it is introduced via lines 134 into the equalizing container 144.

In the event of a falling pressure p of the gas atmosphere 112, gas stored in particular in the equalizing container 144 is supplied to the one or more receiving containers 104 and/or introduced into the one or more receiving containers 104, in a manner which can be regulated by means of valves 148.

In this way, in particular, the pressure p in the gas atmosphere 112 can be maintained at a constant level.

The stored gas may also be introduced through a kind of lance into the liquid region 126 of the respective receiving container 104. The lance is preferably a constituent of the fluid conduit 102.

In the event of an overpressure of the gas atmosphere 112, the storage device 100 is operated preferably in a range from around 0.1 bar to around 0.7 bar, more particularly with an overpressure of around 0.1 to around 0.4 bar, after an equilibrium state has been set.

The pressure of the gas atmosphere is situated preferably in a range between around 0.01 bar and around 0.5 bar.

Figure 6:
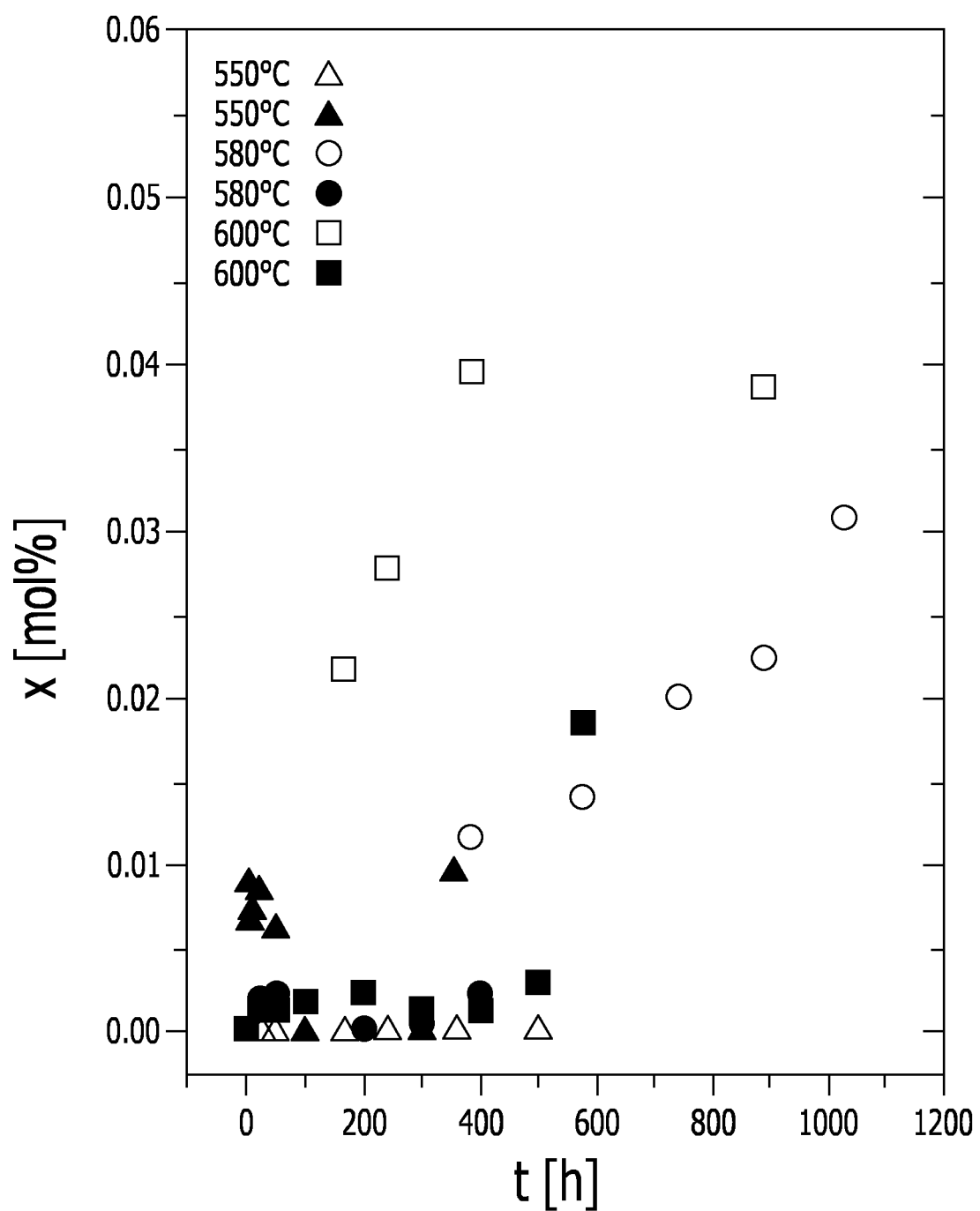
FIG. 6 shows a measurement diagram in which, respectively, oxide ion fractions have been plotted over time, showing, for different temperatures, reference values and values for a storage device comprising a fluidtight fluid conduit.

In FIG. 6 an anion content x in mol % is plotted on the ordinate (y-axis).

The diagram shows results of a study of a sodium nitrate-potassium nitrate salt with fractions of 60 wt % sodium nitrate and 40 wt % potassium nitrate.

The stated salt (available under the name "solar salt") is employed typically at temperatures of up to 565° C.

Plotted on the abscissa (x-axis) is the time t [h] in hours.

The subject of the present study was an oxide ion fraction in the aforesaid salt in liquid state. The oxide ion fraction was studied at temperatures of 550° C., 580° C., and 600° C., and determined in each case for a reference system, which is open and not fluidtight, and for a storage device 100 with fluidtight fluid conduit 102, over a time of up to 1200 hours.

Results for the reference system are illustrated as light-colored data points (not solid), while oxide ion fractions in the inorganic salt 106 in liquid state in a storage device 100 are illustrated as dark data points.

A higher oxide ion fraction denotes a greater decomposition of the anions.

From FIG. 6 it is apparent that, at higher temperatures in particular, an oxide ion fraction in the open reference system is significantly higher than an oxide ion fraction in the salt stored in a fluidtight manner.

While the oxide ion fraction at 600° C. in the open reference system climbs up to around 0.04 mol %, the oxide ion fraction in the case of the salt accommodated in a fluidtight manner is less than half.

From FIG. 6 it is apparent that the abovementioned salt—when it is stored in a fluidtight manner—has an increased lifetime, relative to the closed reference system, even at higher temperatures, because the decomposition reaction is slowed and/or inhibited.

The oxide fractions were measured in each case using ion chromatography.

As a result of the preferably increased lifetime and/or—since the decomposition begins at significantly higher temperatures—of an increased operating temperature, it is possible to increase a (heat) storage capacity of the inorganic salt 106.

Hence, in particular, it is possible to increase the efficiency of steam turbines in systems which use a fluidtight storage of inorganic salts 106. Efficiencies of steam turbines in power plants or processes resembling power plants are directly dependent on maximum operating temperatures of salt melts of the inorganic salt 106, which serves here as heat transfer medium 107 and/or heat storage medium 109.

In comparison to conventional operating temperatures in open systems, it is possible preferably to conduct an operation at an elevated operating temperature and with substantially unchanged thermal stability of the inorganic salt 106.

LIST OF REFERENCE SYMBOLS 100 storage device
102 fluid conduit
102a first fluid conduit section
102b second fluid conduit section
104 receiving container
106 inorganic salt
107 heat transfer medium
109 heat storage medium
108 heat transfer device
110 open- and/or closed-loop pressure control device 110a first open- and/or closed-loop pressure control device
110b second open- and/or closed-loop pressure control device
112 gas atmosphere
114 heating line
116 cooling line
118 first pump
120 second pump
122 first heat transfer element
124 second heat transfer element
126 liquid region
128 heating element
130 gas region
132 heat sink
134 line
136 equalizing device
138 heat exchanger
140 pressure generator
142 compressor
144 equalizing container
146 gas container
148 valve
150 shutoff valve
152 safety device
154 overpressure valve
156 underpressure valve
158 sensor element
160 pressurized gas region
162 pressurized liquid region
200 method step
202 second method step
204 third method step
p pressure
pp partial pressure

The invention claimed is:

1. A method for storing an inorganic salt, the method comprising:
providing an inorganic salt in liquid state, comprising anions which on supply of heat decompose to form at least one gaseous disintegration product; and
setting a pressure of a gas atmosphere, the gas atmosphere being in a chemical equilibrium with the inorganic salt in liquid state, wherein
the gas atmosphere comprises at least one nitrogen oxide,
an oxide ion fraction of the inorganic salt accommodated in a fluidtight manner is less than 0.02 mol %, and
an optional gas region is a spatial region of a receiving container in which the gas atmosphere is disposed in a filled state of the receiving container.

2. The method as claimed in claim 1, wherein the anions are formed of or comprise one or more of the following anions: nitrates, nitrites, chlorides, carbonates, and sulfates.

3. The method as claimed in claim 1, wherein in that the inorganic salt in liquid state comprises cations,
and/or
transition metal cations, nickel cations, molybdenum cations, cobalt cations, zirconium cations, titanium cations, manganese cations, iron cations, copper cations, chromium cations and/or zinc cations,
and/or
alkali metal cations, lithium cations, sodium cations, potassium cations, cesium cations, and rubidium cations, and/or
alkaline earth metal cations, magnesium cations, calcium cations, strontium cations and/or barium cations.

4. The method as claimed in claim 1, wherein the gas atmosphere is formed of or comprises one or more of the following gases: nitrogen, argon, oxygen, ozone, nitrogen monoxide, nitrogen dioxide, dinitrogen tetroxide, dinitrogen pentoxide, nitrosyl azide, N-diazonitramide, dinitrogen trioxide, and trinitramide; or
wherein the gas atmosphere is formed of or comprises one or more of the following gases: nitrogen, argon, hydrogen, chlorine, and hydrogen chloride; or
wherein the gas atmosphere is formed of or comprises one or more of the following gases: nitrogen, argon, oxygen, carbon monoxide, and carbon dioxide; or
wherein the gas atmosphere is formed of or comprises one or more of the following gases: nitrogen, argon, sulfur monoxide, and sulfur dioxide.

5. The method as claimed in claim 1, wherein the inorganic salt in liquid state is provided in at least one receiving container of a fluidtight fluid conduit of a storage device, a constant pressure of the gas atmosphere being set in the at least one receiving container or by means of an open- and/or closed-loop pressure control device.

6. The method as claimed in claim 1, wherein the inorganic salt in liquid state and the gas atmosphere form an isochoric system in a hermetically sealed fluid conduit of a storage device.

7. The method as claimed in claim 1, wherein the pressure of the gas atmosphere is set by increasing a partial pressure of at least one gaseous disintegration product, the partial pressure being increased or by supplying the at least one gaseous disintegration product to the gas atmosphere or by providing the inorganic salt in liquid state in at least one receiving container of a fluidtight fluid conduit.

8. The method as claimed in claim 1, wherein the inorganic salt in liquid state is provided in at least one receiving container of a fluidtight fluid conduit of a storage device, the fluid conduit comprising a heat transfer device for heating and/or cooling the inorganic salt, the heat transfer device comprising a first heat transfer element for heating the inorganic salt and/or a second heat transfer element for cooling the inorganic salt, the inorganic salt being taken off from the at least one receiving container and heated by means of the first heat transfer element, before the inorganic salt in heated state is introduced into the at least one receiving container, and/or the inorganic salt in heated state being taken off from the at least one receiving container and cooled by means of the second heat transfer element, before the inorganic salt in cooled state is introduced into the at least one receiving container.

9. The method as claimed in claim 1, wherein
the inorganic salt being a heat transfer medium and/or a heat storage medium.

10. The method as claimed in claim 3, wherein the cations being formed of or comprising metal cations.

11. The method as claimed in claim 10, wherein the cations being formed of or comprising aluminum cations and/or lead cations.

12. The method as claimed in claim 1, wherein
the gas atmosphere comprises said at least one nitrogen oxide, oxygen and nitrogen monoxide.

* * * * *